May 21, 1963

I. L. GLERUM 3,090,227

FORCE GAUGE

Filed Jan. 18, 1960

*INVENTOR.*
IRVIN L. GLERUM
BY
*Elliott & Pastoriza*
ATTORNEYS

United States Patent Office 3,090,227
Patented May 21, 1963

3,090,227
FORCE GAUGE
Irvin L. Glerum, St. Canoga Park, Calif., assignor to W. C. Dillon & Company, Inc., a corporation of California
Filed Jan. 18, 1960, Ser. No. 3,076
8 Claims. (Cl. 73—141)

This invention generally relates to an improved force gauge, and more particularly concerns a force gauge particularly designed for measuring force exerted by two opposing members.

The force gauge of the present invention has primarily been designed for yielding a direct, precise measurement of electrode pressures exerted by various types of welding machines, particularly spot welders. It will be appreciated, however, that the improved force gauge of the present invention may readily be employed in other diverse applications in which two members exert an opposing force.

With the foregoing in mind, it is an object of the present invention to provide an improved force gauge which is of a simple, extremely rugged construction, and yet which is constructed to yield precise force measurements over a wide range of loads.

Another object of the present invention is to provide an improved force gauge having a minimum number of parts such that it can be economically constructed.

A further object of the present invention is to provide an improved force gauge which is susceptible of convenient adjustment for meeting the requirements of varying load conditions.

Still a further object of the present invention is to provide an improved force gauge which does not require any appreciable maintenance, and yet which may be readily disassembled for readjustment of the indicating means thereof in the event such adjustment is required.

These and other objects and advantages of the present invention are generally achieved by providing a force gauge comprising a first pair of spaced members biased apart and designed to be urged together in response to a force exerting means, for example, an applied compression force imposed thereon. A second pair of spaced members is also provided, and the second pair of spaced members is coupled to the first pair of spaced members such that the second pair is urged apart in response to the urging together of the first pair of spaced members by the force exerting means. In addition, indicator means are coupled to the second pair of spaced members for measuring relative movement of at least one of said second pair of spaced members to thereby attain a proportional indication of the force applied against the first pair of spaced members.

A better understanding of the present invention for an improved force gauge will be had by reference to the drawings, showing merely a preferred illustrative embodiment, and in which.

Figure 1:
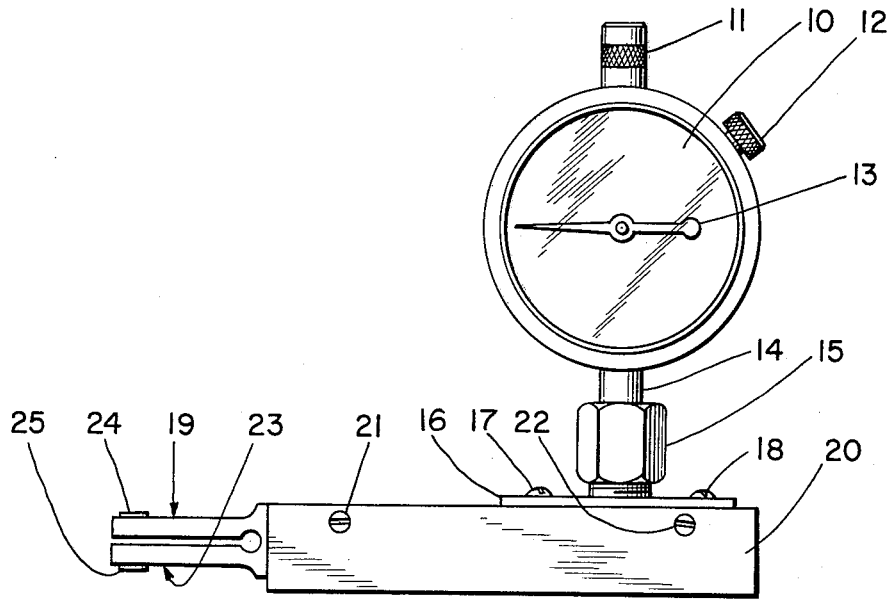
FIGURE 1 is a side elevational view of an improved force gauge according to the present invention.

Referring now to the drawings, there is shown in FIGURE 1 an improved force gauge according to the present invention including a conventional indicator means embodying a dial indicator 10. The dial indicator 10 has radially extending therefrom conventional adjustment knobs 11 and 12. Also, the dial indicator has rotatably mounted therein a pointer 13 for yielding a visual indication of the applied force.

The dial indicator 10 is coupled through a shaft 14 and nut 15 to a mounting base plate 16. The mounting base plate 16 is secured by fastening means in the form of screws 17 and 18 to a force bar unit 19.

The force bar 19 is partially enclosed by a casing 20 which is coupled thereto as by screws 21 and 22.

The force bar unit 19 embodies one end portion, generally designated by the numeral 23, which includes contact buttons 24 for engaging two spaced opposing force exerting members. Thus, the contact buttons 24 and 25 might be positioned between opposing electrodes, for example, of a spot welder to obtain an indication of the pressure on such electrodes.

Figure 2:
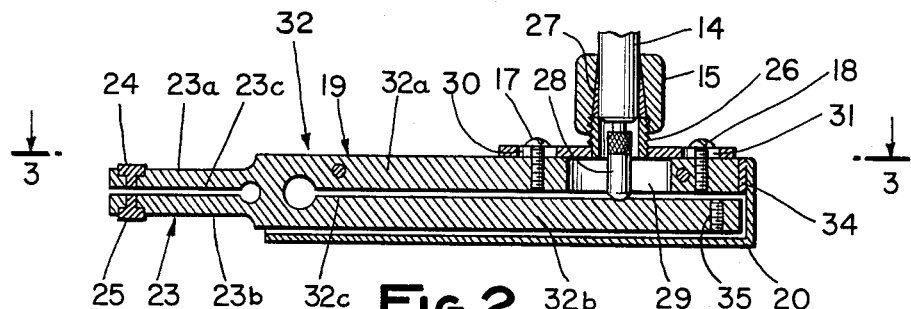
FIGURE 2 is a sectional view through the force gauge shown in FIGURE 1, with only a portion of the indicating means thereof being illustrated.

A more complete understanding of the detailed construction of the improved force gauge of the present invention as well as its operation may be had by reference to FIGURE 2. From FIGURE 2, it will be seen that the nut 15 is threaded onto a chuck 26, the latter being welded or otherwise rigidly secured to the base plate 16. Interposed between the chuck 26 and the shaft 14 is a wedge shaped sleeve 27. The sleeve 27 and nut 15 are provided with co-operating adjacent sidewalls such that as the nut 15 is threaded down onto the chuck 26, the sleeve 27 will be forced into frictional engagement with the shaft 14 such that the shaft 14 and its attachments will be firmly coupled to the force bar 19. It will be noted that the sleeve 27 bears against the chuck 26 such that no axial force is transmitted to the shaft 14 which might effect the "0" reading of the indicator. Also, the lower end of the shaft 14 also bears against or radially overlaps the upper end of chuck 26 for positively positioning the depth of insertion of the shaft 14.

The shaft 14 has projecting from the lower end thereof an adjustable anvil 28. The anvil 28 extends through a grooved opening 29 (more clearly shown in the view of FIGURE 3) provided in an upper portion of the force bar 19 in a manner and to perform a function that will become clearer as the specification proceeds.

Figure 4:
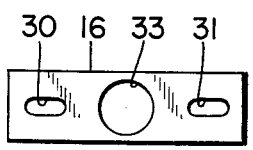
FIGURE 4 is a top elevationl view of the base plate member retaining the indicating means to the force bar, as shown in FIGURES 1 and 2.

Elongated slots 30 and 31 are provided in the base plate 16, as clearly shown in the view of FIGURE 4 through which are received screws 17 and 18 hereinbefore referred to. The slots 30 and 31 enable adjustable longitudinal movement of the base plate 16 and corresponding movement of the indicating means coupled thereto relative to the force bar 19.

The structure of the force bar 19, as such, may now be described.

As previously mentioned, the end portion 23 includes contact buttons 24 and 25 which, as shown in FIGURE 2, may be insertable members either threaded or force fitted into the end portion 23. The end portion 23, as such, is comprised of two spaced apart members 23a and 23b defining therebetween a slotted opening 23c.

The force bar defines another opposite end portion 32 consisting of spaced apart members 32a and 32b defining therebetween a slotted opening 32c.

Figure 3:
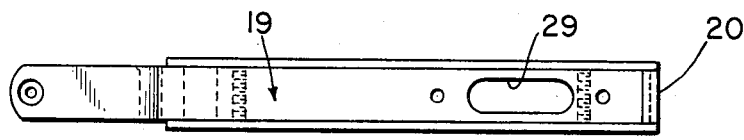
FIGURE 3 is a view of the force bar embodied in the force gauge according to the present invention taken in the direction of the arrows 3—3 of FIGURE 2.

Thus, it will be appreciated that the anvil end member 28 of the indicator shaft 14 extends down through the slotted opening 29 in the upper member 32a to engage the lower member 32b. The slotted opening 29 is of the configuration as shown in FIGURE 3 in order to enable longitudinal movement of the indicator means without having the anvil 28 bind with the sidewalls of the upper member 32a. Of course, in order to accommodate the anvil 28, the base plate 16 must also be provided with a corresponding opening 33 as indicated in FIGURE 4.

The operation of the improved force gauge according to the present invention may now be described. Assuming that two opposing electrodes are positioned in spaced apart relationship so as to exert opposing forces on the contact buttons 24 and 25, it will appreciated that the end portion 23 and more particularly the spaced apart members 23a and 23b thereof will tend to compress such as to narrow down the slot 23c. As the members 23a and 23b move towards one another, it will be evident that a scissoring type of action will take place in which the other spaced members 32a and 32b integrally formed as a part of the force bar 19 will tend to move apart. In consequence, the anvil 28 of the indicator means (which may be appropriately spring biased downwardly) will tend to move downwardly while the remainder of the indicating means will move upwardly in view of its coupled relationship to the member 32a of the end portion 32. Thus the indicating pointer 14 will rotate, not only as a result of the downward movement of the anvil 28 but also as a result of the upper movement of the remainder of the indicating means coupled to the upper member 32a.

It will be appreciated that the relative movement between the members 32a and 32b will vary according to the particular distance from that portion of the force bar 19 at which these respective members merge into the opposite end portion 23. In consequence, according to the particular load conditions, the indicator unit may be moved longitudinally (by loosening screws 17 and 18) a limited distance according to the length of slots 30 and 31.

As seen in the view of FIGURE 2, the casing 20 is provided with an upper peripheral edge which is folded back, as at 34, such that the lower portion of the casing 20 will be spaced from the lower member 32b of the end portion 32. Of course, appropriate tapped holes are provided in the member 32a for receiving the screws 21 and 22 coupled to the casing 20. By spacing the casing 20 from the lower member 32b, it is apparent that the lower member 32b may move relative to the casing without engaging the latter.

In consequence of the aforementioned construction, it will be evident that both the casing and indicator unit will move with the upper member 32a and relative to the lower member 32b. The casing 20 may be readily removed by unscrewing the screws 21 and 22 if desired for cleaning purposes. Furthermore, the indicator unit may be readily removed for repair or replacement by loosening the nut 15 from the chuck 26 without altering predetermined calibration of the instrument. This same procedure may be employed to enable 360 degree rotation of the indicator unit for viewing from any desired position.

It will be appreciated that to accommodate wider ranges of loads, it is merely necessary to vary the dimensions or other material characteristics of the force bar 19. Of course the slots 30 and 31, as well as the groove 29 may be lengthened if desired to accommodate a limited increased range of loads. Also, of course, the range may be varied by changing dial indicators 11, while the calibration of the force gauge will not be altered.

If desired, a set screw 35, as shown in FIGURE 2, may be provided for preloading the member 32a with respect to the member 32b. Thus, by threading the set screw 35 inwardly until it engages the member 32a, a slight biasing force may be imposed tending to spread apart the members 32a and 32b.

In certain designs, the contact buttons 24 and 25 may have their inner ends extend inwardly a given distance into the slot 23c whereby these members may function as an overload stop.

Figure 5:
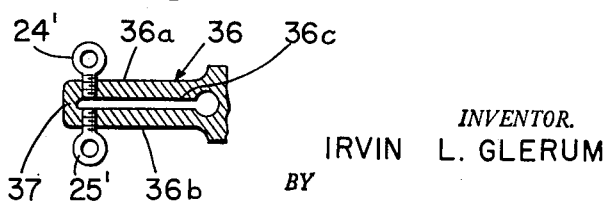
FIGURE 5 is a modification of the force gauge of FIGURE 1.

Also, it should be noted that the contact buttons 24 and 25 may be modified to include eyes, for example as members 24' and 25' in FIGURE 5, whereby they may be employed with tension forces. In such event, as the members 23a and 23b are drawn apart, the members 32a and 32b will be urged together in a reverse scissoring action.

In FIGURE 5, there is shown a modification of the end portion 23, wherein this end portion is closed off. Thus, the end portion 36 is connected at 37 and defines members 36a, 36b, and an inner slot 36c. With such a construction, greatly increased capacities may be attained without change of materials or physical dimensions.

Of course, other changes and modifications may be made without departing from the spirit and scope of the claims as hereinafter set forth.

What is claimed is:

1. A force gauge comprising: a force bar, said force bar having a first end portion defining a first longitudinally extending inner slot and its opposite second end portion defining a second longitudinally extending inner slot, said first and second slots lying in substantially the same plane and extending to points in close proximity to each other relative to the length of said bar, said first end portion being designed for coupling to opposing force exerting members acting to effect a change in the width of said first slot by lateral movement of said first end portion whereby an opposite change is effected in the width of said second slot by lateral movement of said second end portion; and, indicator means coupled to said second end portion for measuring said lateral movement thereof.

2. A force gauge, according to claim 1, in which said first end portion is split to define said first slot.

3. A force gauge comprising: a force bar, said force bar having one end portion split in a given plane to define a first pair of spaced members and its opposite end portion split in substantially the same given plane to define a second pair of spaced members, said opposite end portion being split to a point proximate the inner end of the split of said one end portion relative to the length of said bar, and said one end portion being designed to be compressed by a force exerting means such that said opposite end portion is urged apart; and, indicator means coupled to said force bar for measuring the movement of said opposite end portion.

4. A force gauge, according to claim 3, and fastening means coupling said indicating means to said force bar, said fastening means enabling adjustable limited longitudinal movement of said indicating means relative to said opposite end portion.

5. A force gauge, according to claim 3, and a casing coupled to one of said members of said opposite end portion, said casing being spaced from the other member of said opposite end portion.

6. A force gauge comprising: a force bar, said force bar having one end portion split in a given plane to define a first pair of spaced members and its opposite end portion split in substantially the same given plane to define a second pair of spaced members, said opposite end portion being split to a point proximate the inner end of the split of said one end portion relative to the length of said bar, and said one end portion being designed to be compressed by a force exerting means such that said opposite end portion is urged apart; an indicator means coupled to said opposite end portion, one of said members in said opposite end portion having an opening therethrough, and said indicator means including an anvil adapted to extend through said opening to engage the other of said members in said opposite end portion whereby relative movement of said other of said members of said opposite end portion will effect proportionate movement of said anvil of said indicator means.

7. A force gauge, according to claim 3, in which said indicator means is coupled to one of said spaced members in said opposite end portion.

8. A force gauge comprising: a first pair of spaced members biased apart at their outer ends and connected together at their inner ends and designed to be urged together at their outer ends in response to an applied compression force exerting means imposed thereon; a second pair of spaced members lying in substantially the same plane as said first pair of spaced members, said second pair of spaced members being connected together at their inner ends in integral relationship with said inner ends of said first pair of spaced members so as to form a pivot point whereby said second pair of spaced members are urged apart in response to the urging together of the outer ends of said first pair of spaced members; and, indicator means coupled to said second pair of spaced members for measuring relative movement of at least one of said second pair of spaced members.

References Cited in the file of this patent

UNITED STATES PATENTS

| | | |
|---|---|---|
| 2,382,289 | Burt | Aug. 14, 1945 |
| 2,695,518 | Huck | Nov. 30, 1954 |

FOREIGN PATENTS

| | | |
|---|---|---|
| 813,318 | Germany | Sept. 20, 1954 |